United States Patent [19]

Soullard et al.

[11] Patent Number: 4,797,975
[45] Date of Patent: Jan. 17, 1989

[54] PROCESS AND PLANT FOR THE TREATMENT OF MEAT OF CATTLE OR OTHER QUADRUPEDS

[75] Inventors: Marcel Soullard; Victor Brochard, both of Cholet, France

[73] Assignee: Boca-Quest, Cholet, France

[21] Appl. No.: 2,910

[22] Filed: Jan. 13, 1987

[30] Foreign Application Priority Data

Jan. 13, 1986 [FR] France ............... 8600383

[51] Int. Cl.[4] ............................................. A22C 17/02
[52] U.S. Cl. ........................................ 17/46; 17/1 G
[58] Field of Search ................ 17/24, 1 R, 1 G, 46

[56] References Cited

U.S. PATENT DOCUMENTS

| 2,833,700 | 4/1959 | Liebmann, Jr. | 17/24 |
| 3,317,949 | 5/1967 | Garcia et al. | 17/24 |
| 3,940,830 | 3/1976 | Anderson et al. | 17/24 |
| 4,090,275 | 5/1978 | Jorgensen et al. | 17/24 |
| 4,179,021 | 12/1979 | Wallace | 198/341 |
| 4,241,473 | 12/1980 | Korhonen | 17/24 |
| 4,602,403 | 7/1986 | Martin | 17/24 X |

FOREIGN PATENT DOCUMENTS

| 1019112 | 10/1977 | Canada | 17/2 |
| 0049689 | 4/1982 | European Pat. Off. | |
| 0074029 | 3/1983 | European Pat. Off. | |
| 0121477 | 10/1984 | European Pat. Off. | |
| 3204448 | 8/1983 | Fed. Rep. of Germany | |

Primary Examiner—Willie G. Abercrombie
Attorney, Agent, or Firm—Fleit, Jacobson, Cohn & Price

[57] ABSTRACT

The plant for semiautomatic treatment of quarters of meat of cattle or other quadrupeds comprises an overhead rail arrangement (1) at constant height forming a closed loop, a plurality of suspending arms (6) suspended at regular intervals along the overhead rail (1), means for continuously driving the set of the arms along the said closed overhead rail loop (1), a plurality of stationary treatment stations (8) arranged along at least one part of the closed loop and outside the latter, each station (8) comprising a platform (9) equipped with means for automatic vertical movement with manual control, a conveyor belt system (10, 11) arranged under the path of the arms (6) in order to receive the muscles removed at various treatment stations (8), and an automatic transfer and loading device (18) equipped with a grasping member capable of performing a telescopic movement followed by a rotary movement in order to move a quarter initially hanging from a rail (17) as far as a suspending arm (6) situated in a region (4) of the closed loop forming a suspending station.

30 Claims, 11 Drawing Sheets

PROCESS AND PLANT FOR THE TREATMENT OF MEAT OF CATTLE OR OTHER QUADRUPEDS

The present invention relates to a process and a plant permitting semiautomatic treatment of quarters of meat of cattle or other quadrupeds, which are initially hanging vertically. The treatment of these quarters involves a series of manual or automatic operations of removal of the muscles without boning.

Until now, the various operations of treatment of beef quarters have required considerable efforts on the part of the operators, the quarters having to be turned over several times on a worktable in order to permit the separation of some parts of the quarter, boning and then the carving of the muscles.

The subject of the present invention is a process and a plant which make it possible to reduce considerably the efforts required to carry out these treatments, while substanially increasing the speed by virtue of an automation and a presentation of the quarter in a position which makes the operators' work much easier. It is thus possible to perform the removal of the muscles in an ergonomic position which leads to economy of movements and is advantageous to the quality of the work.

The semiautomatic treatment process of the invention applies to quarters of meat of cattle or other quadrupeds which are initially hanging. The process of the invention comprises the following stages: the quarter is moved from an initial position as far as a suspending station forming part of a closed loop equipped with an overhead rail and a plurality of means of suspension for quarters travelling continuously along the said rail. After the quarter has been suspended from a means of suspension, the quarter hanging vertically at a constant height is moved in front of a plurality of treatment stations which are arranged at intervals along the path forming a closed loop. Removal of the muscles from the quarter is performed successively at each station, permitting a vertical movement in both directions which is controlled by each operator at each treatment station so as to enable him to adopt the ergonomic position which is best suited to his task and to change his position continually in relation to the quarters which move in front of his station. At the last treatment station, the bones remaining after the removal of all the muscles from each quarter are then released so as to permit the means of suspension thus released to grasp a new quarter to be treated.

A rotation of the quarter about itself is preferably permitted at at least some treatment stations so as to permit the removal of the muscles over the entire periphery of the quarter. At other treatment stations, on the other hand, the quarter is held so as to prevent any rotation about itself, by being grasped in the region of the vertebrae, for example the dorsal and lumbar vertebrae in the case of a hindquarter.

In front of some stations it is possible, preferably, to change the slope of the quarter in relation to the vertical so as, once again, to facilitate certain muscle removal operations.

After some of the muscles have been removed from a quarter and after the retention of the lower part of the quarter has been secured, it is possible, in the case of a hindquarter, to section the quarter into two portions in order to enable the leg, still hanging vertically, to rotate freely for the removal of the remaining muscles from the leg. The lower part of the quarter continues its travel at the same time as the leg following the same closed loop path, also permitting the muscles remaining on this lower part to be removed.

The plant for semiautomatic treatment of quarters of meat of cattle or other quadrupeds according to the invention permits the process of the invention to be implemented. The plant comprises a constant height overhead rail arrangement forming a closed loop and on which a plurality of arms for suspending at regular intervals are suspended at regular intervals. The plant comprises means for continuously driving the set of arms along the closed loop of the overhead rail and a plurality of stationary treatment stations arranged along at least one portion of the closed loop and outside the latter. Each station comprises a platform equipped with manually-controlled means of automatic vertical movement. A removal system, for example in the form of conveyor belts, is arranged under the path of the arms in order to receive the muscles removed by the operators at the various treatment stations.

The plant additionally comprises an automatic loading and transfer device fitted with a member for grasping the quarters which is preferably capable of performing a telescopic motion followed by a rotational motion in order to move a quarter which is initially hanging from a hook to a suspension arm of the plant when this is in a region of the closed loop which forms a suspending station.

A power station for the supply of energy, for example electrical and pneumatic energy, is arranged within the closed loop. The energy supply power station comprises a central stationary collector interacting with a rotary member, for example tray-shaped, driven synchronously with the suspension arms. The tray carries one or more distributing means for energy supply lines, each distributing means being connected to a group of arms.

It thus becomes possible to provide on each arm a number of members which are driven or controlled electrically or pneumatically, together with electrical supply cables and compressed air lines which are wound onto a number of elastically retracting take-up reels, each of which receives a supply line connected to a group of arms.

An arrangement of this kind is particularly advantageous where the closed overhead rail loop is of an overall oblong shape. The supply of energy, for example electrical and pneumatic, is then ensured by means of these lines whose tension is kept constant by the take-up reels driven in rotation by the tray of the supply station arranged within the closed loop, the rotary motion being synchronized with the motion of the set of the arms along the closed overhead rail loop.

An arrangement of this kind has the advantage of a single power station for the set of the arms, which simplifies their construction and permits the whole plant to be simplified and made lighter in weight.

Each arm preferably comprises an oscillating suspension device comprising roller wheels interacting with the overhead rail and means for suspending the quarter, comprising an automatic, pneumatically controlled vertical clamp mounted so that it can rotate freely about a vertical axis. By virtue of this arrangement, it is possible to produce manually a rotation of the quarter in order to remove the muscles over the entire periphery of the latter. In addition, an oscillation of low amplitude may be produced, which also permits a better presentation of some parts of the quarter with a view to the removal of the muscles at some treatment stations.

The arm additionally comprises a substantially vertical rod whose upper part is fastened to the suspension device on the inner side of the closed loop in relation to the quarter. At least one pneumatic, automatically controlled horizontal clamp is mounted on the said rod either in a rigid manner or so that it can pivot and is adapted so that it can clamp a part of the skeleton of the suspended quarter at at least some treatment stations.

In an embodiment which is adapted to the case of a hindquarter, the rod of each arm comprises two horizontal clamps placed one above the other, thus permitting a good retention of the lower part of the quarter to be ensured by clamping in two places in the dorsal vertebrae region.

The actuation of these clamps takes place automatically when the operator applies a push to the quarter suspended from the vertical clamp until a specified part of the skeleton enters between the horizontal clamps.

Each arm also preferably carries an energy distribution box mounted on the abovementioned rod and connected via at least one energy supply line to the power supply station which is situated within the closed loop, as indicated earlier.

The various clamps which permit the skeleton to be clamped not only by the top part of the quarter but also by other parts, for example the vertebral region in the case of a hindquarter, are fairly similar in structure. They comprise two pivoting jaws mounted on a pivot fastened integrally to the end of the rod of a pneumatic jack and an abutment means interacting with the jaws to cause their automatic closure by a withdrawal motion of the jack rod. Means for holding the jaws are also provided in order to produce the automatic opening of the said jaws by a forward motion of the jack rod. An arrangement of this kind has the advantage of simplicity and of robustness. Other means could naturally be envisaged for the same purpose.

A presence detector based on contact is advantageously mounted between the jaws and controls the action of the jack when a part of the quarter enters between the jaws. This entry may be produced by the operator himself pushing the quarter or automatically at the suspending station.

In order to avoid any accident in the event of a transient and accidental interruption of the energy supply, the vertical clamp from which the quarter is suspended also comprises a safety device for locking the jaws in closed position. This device comprises a transverse wishbone actuated by a locking jack which immobilizes the rod of the jack operating the jaws.

A plurality of position sensors is provided on the arms and at specified locations of the plant in the path of the said arms. These sensors interact with fixed cams arranged along the path of the arms or with cams fastened integrally to the arms, in order to automatically control some of the clamp opening and closing movements. The operators thus need not concern themselves with these movements and may devote themselves entirely to the removal of the muscles.

The plant additionally comprises a lower rail arranged within the loop formed by the abovementioned overhead rail and also forming a loop of the same overall shape in order to guide the lower end of the arm rods. In the case of the treatment of hindquarters, the lower rail is provided with discontinuities in its path and interacts with the lower ends of the arm rods in order to change the slope of these rods automatically at some treatment stations. Thus, in particular at the first stations the rod slopes in relation to the vertical so as to prevent the horizontal clamps for the vertebrae from coming into contact with the hindquarter. This enables the operators to proceed with the operations for the removal of the muscles over the entire periphery of the hindquarter while rotating the latter about itself, the hindquarter being held only by the vertical clamp for the knuckle, by which it is suspended.

Each platform of the plant is mounted so that it can move vertically on a stationary vertical frame by means of roller wheels. The vertical motion of the platform is produced by means of a double-acting pneumatic or hydraulic jack controlled by a pivoting transverse rod which is arranged so as to be capable of being easily actuated by the operator's leg. By applying a greater or lesser push to this pivoting rod, the operator can control either an upward or a downward movement of the platform without the need to discontinue his muscle removal operations. The operator can thus adopt the most ergonomic position for each removal of muscle from the quarter which travels in front of his treatment station. It will be understood that the control of movement of the platform could be implemented using other means. Nevertheless, it is preferably appropriate that this control may be carried out without the need for the operator to discontinue his task. The platform length is chosen so that the operator can follow the quarter over a part of its continuous travel in front of the treatment station, without the need for the operator to leave the platform.

The telescopic transfer arm of the plant is mounted on a toothed crown ring capable of being driven in rotation and capable of vertical motion under the action of a hydraulic jack. The telescopic transfer arm is mounted so that it pivots on the crown ring, a hydraulic jack controlling its slope in relation to the horizontal. A transverse clamp for suspending the quarter is mounted at the end of the telescopic transfer arm.

This telescopic transfer arm is controlled automatically so as to perform the following movements: a horizontal telescopic movement until the transverse suspending clamp has seized the quarter, for example by the upper part of the leg in the case of a hindquarter. A combined rotary and rising motion, preferably through an angle of the order of 90°, enabling the quarter suspended from the end of the transfer arm to be placed in front of a suspending station. An upward pivoting in order to introduce the end of the quarter between the jaws of the vertical clamp of one of the arms at the suspending station.

The combination of these movements enables a quarter which is initially hanging on a hook to be transferred as far as the suspending station of the plant, following which the quarter is conveyed along the overhead rail loop in front of each of the successive treatment stations.

Despite the undoubted advantage of this particular loading and transfer device, it will be understood that other means of transfer could be employed in order to suspend a quarter by its upper end, knuckle or neck, at the suspending station of the plant.

An automatic cutting device is advantageously provided in the case of a hindquarter for sectioning the tendon, thus releasing the hook on which the hindquarter was initially hanging.

The invention will be understood better by studying the detailed description of a particular embodiment of a plant for treatment hindquarters of beef, taken by way of an example which is not limiting in any manner and illustrated by the attached drawings, in which.

Figure 1:
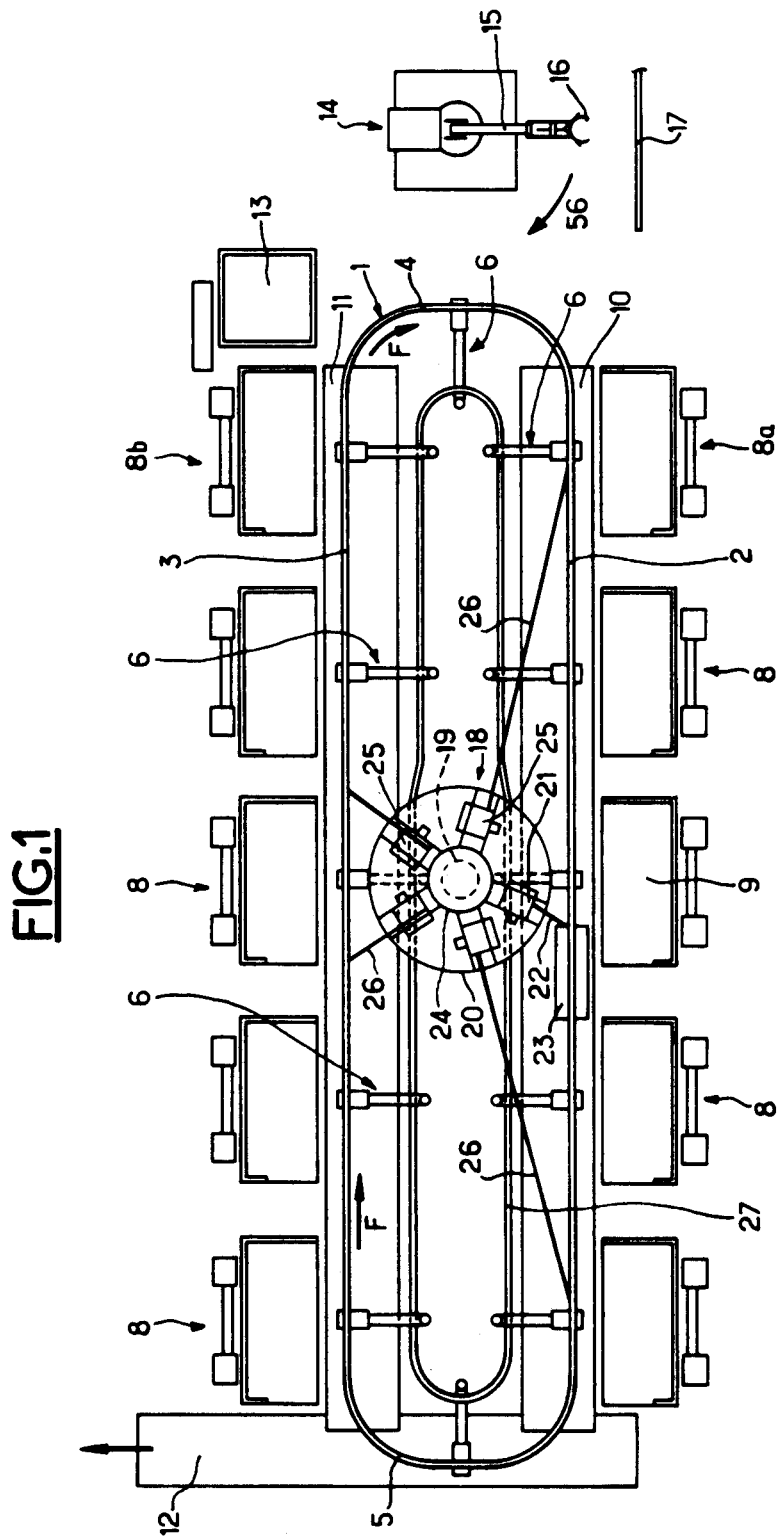
FIG. 1 is a diagrammatic view from above showing the combination of the essential components of a plant according to the invention.

As shown diagrammatically in FIG. 1, the plant comprises an overhead rail 1 forming an oblong closed loop. The rail 1 is maintained at a constant height over the entire loop, which consists of two rectilinear sections 2 and 3 and two substantially circular sections 4 and 5 connecting the rectilinear sections 2 and 3.

A plurality of suspending arms 6 is suspended at regular intervals along the overhead rail 1. The driving of the various arms, as well as their retention at regular fixed intervals is produced by means of a chain 7 which can be seen, in particular, in FIG. 6 and which is driven by a sprocket mechanism of a conventional type (not shown in the Figures), with the driven sprockets interacting with the links of the chain 7.

A plurality of stationary treatment stations 8 is arranged outside the closed loop of the rail 1 and, more precisely, in the example illustrated, along the two rectilinear sections 2 and 3. In the example illustrated, five treatment stations 8 are thus arranged on each side of the rail loop 1 and twelve arms 6 are suspended from the rail 1 so that when an arm 6 is located precisely in the axis of a treatment station 8, there is still one arm in the axis of the semicircular region 5 which is not in use and an arm in the axis of the semicircular region 4, which forms a suspending station.

Each treatment station 8 is equipped with a platform 9 capable of moving vertically by means of a manually controlled lifting device.

A conveyor belt 10 travelling from the right to the left in FIG. 1 permits the removal of the muscles removed at the various stations 8 situated along the rectilinear section 2. A similar conveyor belt 11, also travelling from the right to the left in FIG. 1, similarly permits the removal of the muscles removed at the stations 8 situated along the rectilinear section 3.

The two conveyor belts 10 and 11 discharge the muscles removed in this manner onto a removal belt 12 whose path is perpendicular to that of those just mentioned, the muscles being thus conveyed to a workshop for further treatment. Naturally, other means could very well be envisaged for the removal of the muscles removed, such as conveying trolleys or individual hanging swingtrays.

The set of the arms 6 driven by the chain 7 moves in the direction of the arrows F. The first treatment station 8a is therefore that situated in the rectilinear section 2 immediately downstream of the suspending station situated in the semicircular region 4, whilst the last treatment station 8b is situated along the rectilinear section 3, immediately before the same suspending station. The bones remaining after the removal of all the muscles from the quarter are removed in the bin 13.

The plant also comprises an automatic transfer and loading device 14 comprising a telescopic arm 15 fitted with a gripping clamp 16 and capable of performing a rotary motion in order to move a quarter initially hanging from a conveying rail 17 to the suspending region of the rail 1 situated in the semicircular section 4.

A power station for supplying electrical and pneumatic energy, indicated as a whole by reference 18, is arranged within the closed loop, substantially in its median section. The power station 18 comprises a stationary collector 19 fitted with peripheral rings interacting with friction brushes (not shown in the Figure) which enable electricity to be transmitted to a distribution system mounted on a rotary tray 20 driven synchronously with the motion of the arms 6. A take-up reel 21 makes it possible to wind on an electric cable connected to the abovementioned friction brushes. The electric cable 22 wound onto the take-up reel 21 is also connected to the box 23 for controlling and steering the whole plant. This box is suspended from the rail 1 and, like the arms 6, travels by means of the chain 7. The take-up reel 21 thus permits the whole plant to be supplied with electrical energy while keeping the supply cable 22 under constant tension.

Within the stationary central collector 19 are situated delivery lines for compressed air which is conveyed via a rotary seal 24 to four take-up reels 25 onto which are wound flexible lines 26 connected to specified points along the chain 7 in order to supply pneumatic energy to a group of several arms 6. The take-up reels 25 thus make it possible to keep the flexible lines 26 under constant tension when their point of application on the chains 7 travels along the rail 1, this being done despite the oblong shape of the loop formed by the rail 1.

Figure 3:
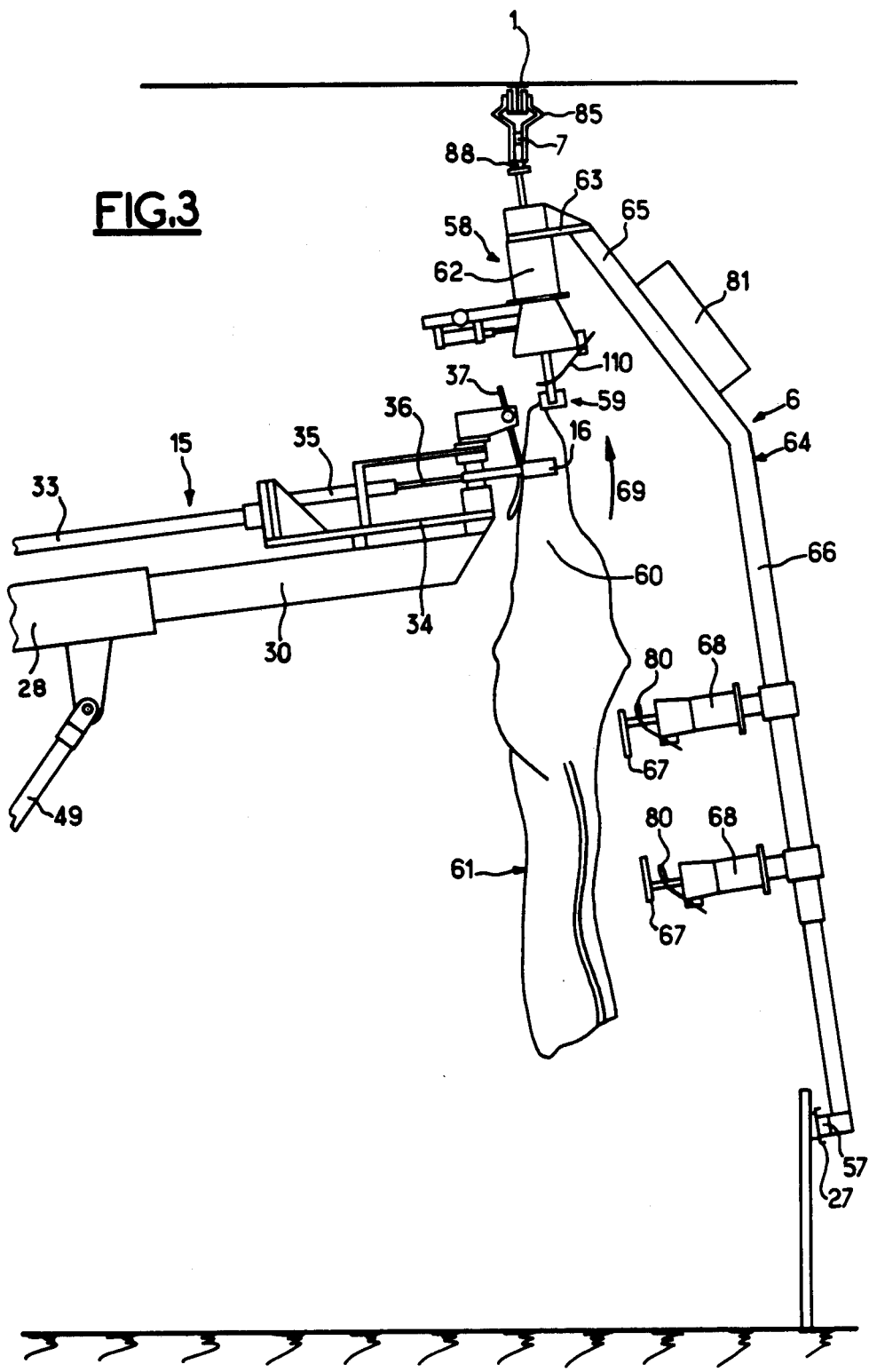
FIG. 3 is a diagrammatic elevation view showing the suspending station during an operation of suspending a hindquarter.
Figure 4:
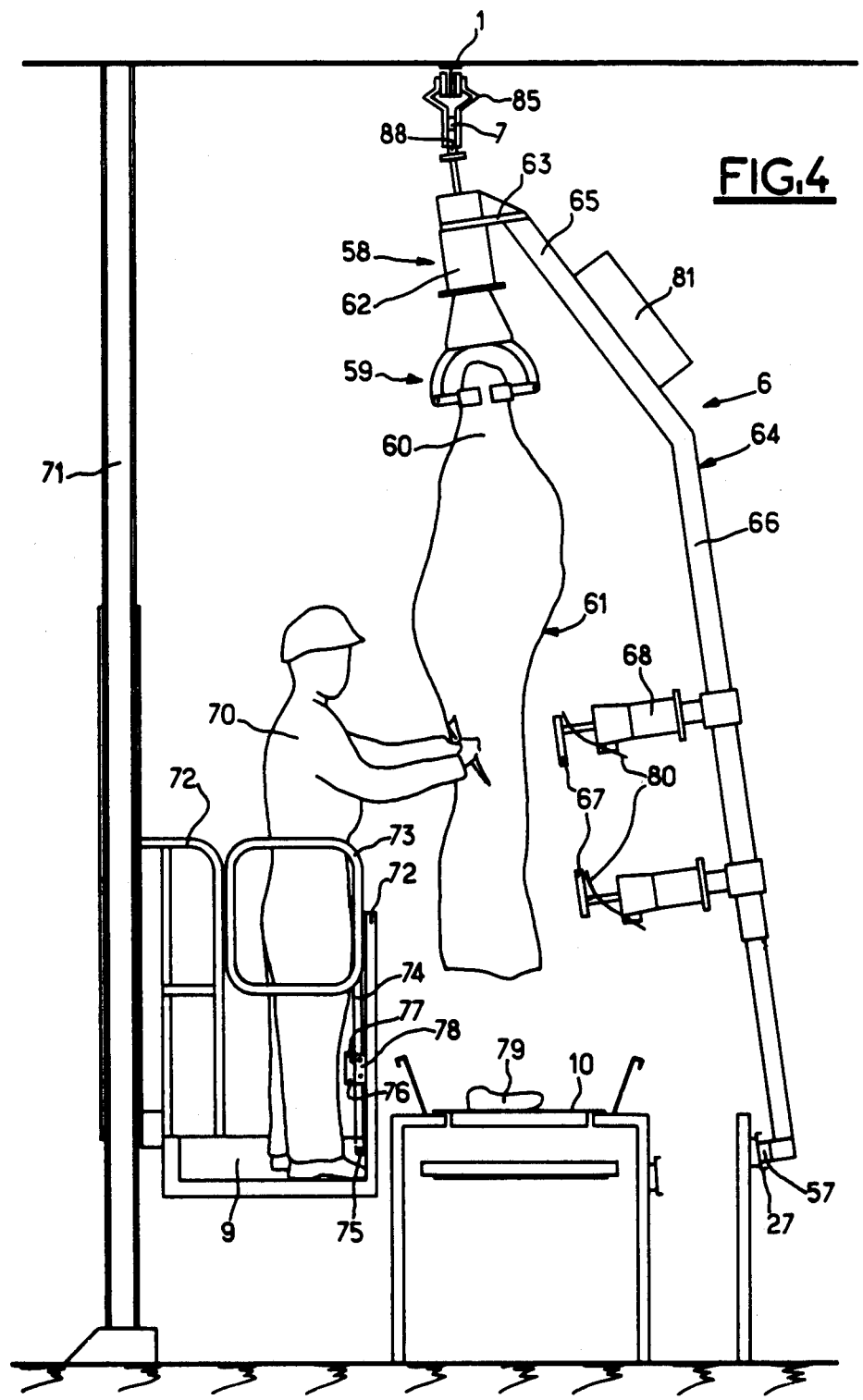
FIG. 4 is an elevation view of the first treatment station showing an operator in the course of removing the muscles from a hindquarter which is merely suspended and which can consequently undergo rotation about itself.
Figure 5:
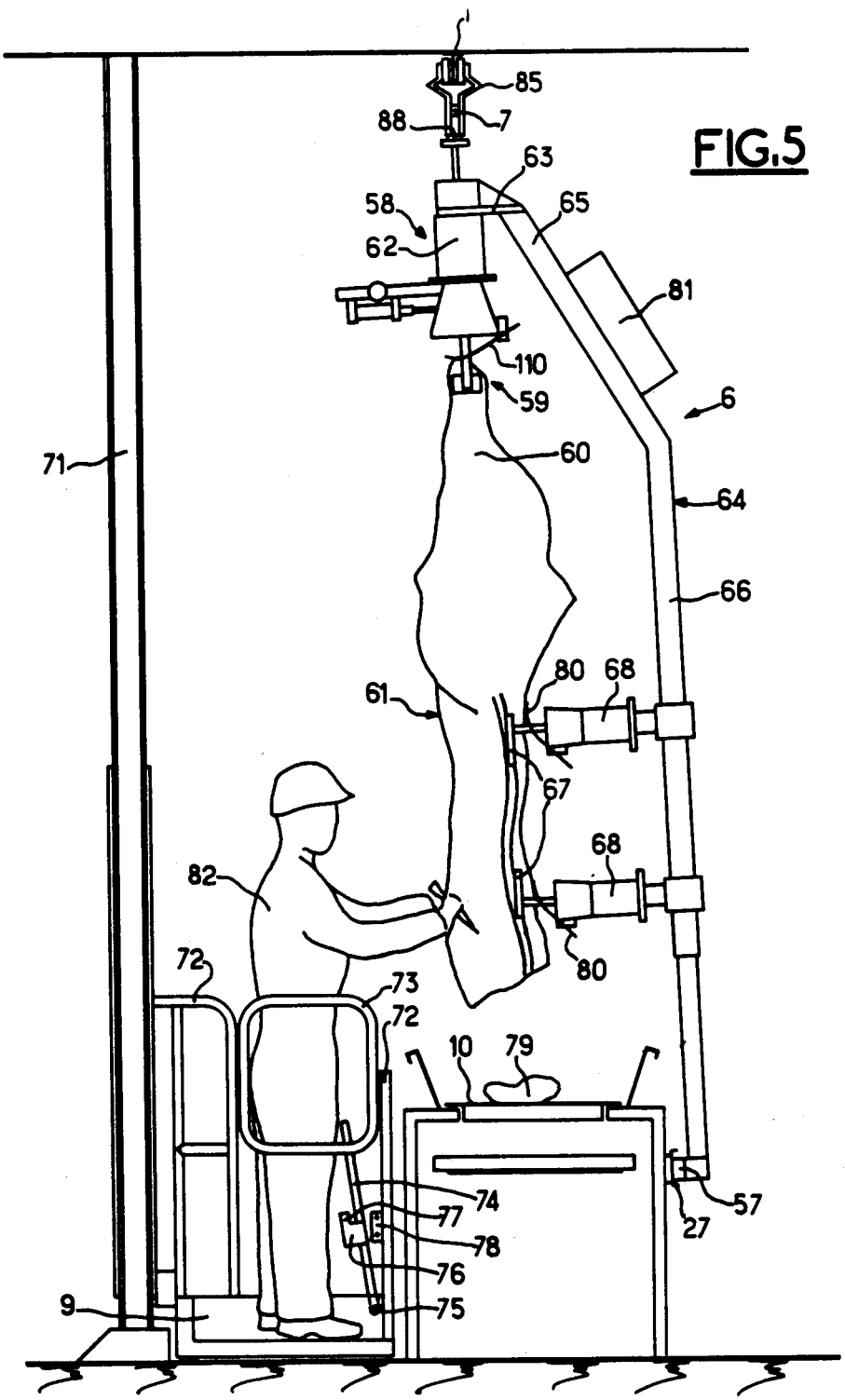
FIG. 5 is a diagrammatic elevation view similar to FIG. 4 but taken at a subsequent treatment station in which the suspended hindquarter is also held in the region of the dorsal and lumbar vertebrae.

It will be noted that in order to simplify the drawings, the electrical cable 22 and the compressed air lines 26 have not been shown in FIGS. 3 to 5.

The plant also comprises a lower rail 27 arranged within the upper rail loop 1 and also forming a loop of the same identical shape overall. However, in the example illustrated, the lower rail 27 is further away from the overhead rail 1 in the region of the first two treatment stations and also in that of the last two treatment stations. The lower ends of the arms 6 comprise roller wheels which travel along the lower rail 27 and this, taking into account the discontinuities which are thus produced along its path, makes it possible to change automatically the slope of the arms 6 in accordance with the treatment stations. The arms 6 are, in fact, held by their upper ends, which travel along the overhead rail 1 and by their lower ends, which travel along the lower rail 27.

Figure 2:
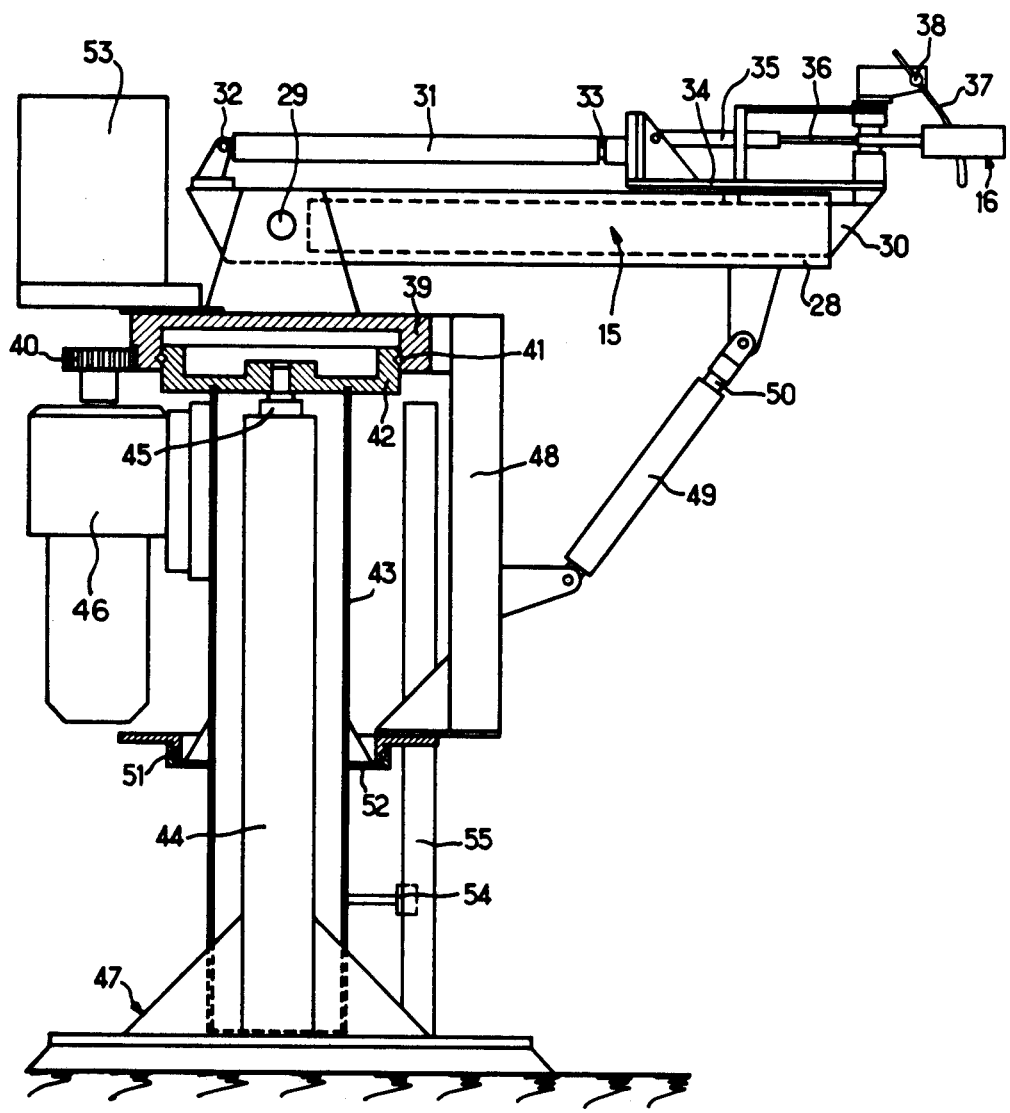
FIG. 2 is a partially sectioned elevation view of the device for loading and transfer of hindquarters.

If reference is made to FIG. 2, which illustrates the transfer and loading device, the telescopic arm 15 equipped with the suspending member 16 can again be seen.

The telescopic arm 15 comprises a longitudinal beam 28 mounted so that it pivots around a horizontal pivot 29 and a sliding extension 30 which can move in translation inside the longitudinal beam 28 under the action of the hydraulic jack 31 whose cylinder is attached at 32 to the end of the longitudinal beam 28, while the rod 33 is connected via a plate 34 to the end of the extension 30. Under these conditions it will be understood that the action of the jack 31 enables the transfer arm 15 to be extended telescopically by the extension 30 being made to slide inside the longitudinal beam 28.

The plate 34 permits the mounting of a hydraulic jack 35 whose rod 36 controls the opening and the closing of the two jaws of the gripping clamp 16. The jack 35 is controlled by a presence sensor 37 mounted on a pivot shaft 38.

The longitudinal beam 28 is mounted by means of its pivot 29 on the lower rotary ring 39 of a toothed crown ring driven in rotation by the pinion 40 and mounted by means of a rolling bearing 41 around a stationary inner ring 42. The stationary ring 42 is fastened integrally to a vertical column 43 which is fixed in rotation and inside which is mounted a hydraulic jack 44 whose rod 45 bears on the inner ring 42 fastened integrally to the column 43. The hydraulic motor 46 which drives the pinion 40 in rotation is fastened to the periphery of the column 43. To prevent the rotation of the column 43, a roller wheel 54 fastened integrally to the crown ring 43 interacts with a stationary vertical slide 55 embedded in the ground. The cylinder of the hydraulic jack 44 rests on the ground by means of a base plate 47. A vertical beam 48 mounted between the outer ring 39 and the column 43 provides support for a hydraulic jack 49 whose rod 50 is connected to the free end of the longitudinal beam 28 so as to enable the latter to pivot upwards around its pivot 29. The bottom part of the beam 48 is held by means of a thrust ball bearing 51 whose rotationally fixed outer ring 52 is fastened integrally to the column 43.

The supply of hydraulic fluid to the whole transfer and loading device is performed by the hydraulic power unit 53 which is mounted on the outer rotary ring 39.

The transfer and loading device permits an automatic combined movement of the arm 15 carrying the clamp 16 and consequently of a quarter of meat which is suspended thereby. In fact, the telescopic arm 15 can move in translation under the action of the hydraulic jack 31; its slope in relation to the horizontal may be changed by the action of the hydraulic jack 49; a rotation of the entire arm 15 around a vertical axis can be produced by the action of the pinion 40 which causes the rotation of the outer ring 39 which carries the telescopic arm as well as the beam 48 and the jack 49. Furthermore, the telescopic arm 15 can be moved vertically by actuating the hydraulic jack 43, which causes the inner ring 42 and the column 43 to rise.

This device is capable of suspending by the end of the knuckle a hindquarter hanging from the rail 17 (FIG. 1) at a particular height, and then transferring the quarter suspended by the clamp 16 by making it perform a rotation through an angle of approximately 90° (as can be seen in FIG. 1 according to the arrow 56) while lifting it through the action of the hydraulic jack 44 until it reaches the necessary height for the knuckle to be gripped by an arm 6 carried by the overhead rail 1 at a level higher than that of the rail 17. In general, the quarter hangs from the rail 17 by a hook. In order to release the quarter from this hook there may be provided an automatic tendon-cutting device which is actuated as soon as the clamp 16 has closed on to the knuckle. The additional upward pivoting produced by the action of the hydraulic jack 49 enables this suspending to be made easier, as can be seen in FIG. 3.

If reference is made to FIG. 3, this, in effect, once again shows diagrammatically a part of the transfer and loading device illustrated in FIG. 2. It also shows, represented diagrammatically and in cross-section, the overhead rail 1 and an arm 6 with its upper end fastened integrally to the chain 7 and with its lower end resting on the rail 27 by means of a roller wheel 57.

The arm 6 illustrated in FIG. 3 is identical to all the arms of the plant. It comprises an oscillating suspension device indicated as a whole by reference 56 and equipped with suspending means comprising a component 59 for the knuckle 60 of a hindquarter of beef 61. The clamp 59 is controlled by a device 62 mounted so as to rotate around a vertical axis on a head 63. A substantially vertical rod 64 is fastened by its top part to the head 63, for example by welding. The rod 64 comprises a top part sloping in relation to the vertical, shown at reference 65, and a longer lower part 66, which can take up a substantially vertical position in front of certain treatment stations or a position slightly sloping in relation to the vertical as illustrated in FIG. 3 as a function of the position of the rail 27 in relation to that of the overhead rail 1. It will be noted that, since the end of the rod 64 is not tied to the rail 27 but only guided by the latter, the rod 64 can also slope in another plane, forward or backwards in relation to the axis of suspension of the quarter.

Two horizontal clamps 67 equipped with their control device 68 are fixed rigidly to the oblong section 66 of the rod 64, at right angles to the said section 66. The slope of the rod 64 in relation to the vertical, permitted by the oscillating suspension device 58 and produced by the distance separating the rail 27 makes it possible to move away the clamps 67 for suspending the quarter 61 which is introduced at this suspending station while being suspended by the clamp 16 of the telescopic arm 15. The clamps 67 could also be mounted so as to be movable in rotation or pivoting on the rod 64. In an alternative form which is not illustrated, a device for retracting the clamps 67 can be provided, comprising, for example, in the case of each clamp 67, a jack producing a limited rotation of the clamp 67 in relation to the rod 64 so as to avoid any contact between the quarter 61 and the end of the clamps 67 which are then situated slightly offset or retracted in relation to the position illustrated in FIG. 3. The slope of the rod 64 produces, furthermore, a corresponding slope of the suspension device 58 and of the knuckle suspension clamp 59. The pivoting motion of the telescopic arm 15 produced by the action of the hydraulic jack 49 enables the top end of the knuckle 60 to be readily introduced into the suspending clamp 59, this being possible despite the slope of the said clamp 59. This motion, which is performed according to a circle centered on the pivot 29 of the longitudinal beam 28 (FIG. 2) is exaggerated in FIG. 3 in order to make it easer to understand and is shown symbolically by the arrow 69.

FIG. 4 illustrates diagrammatically the first treatment station of the plant, shown at reference 8a in FIG. 1. The identical members, bearing the same references, can be seen again.

The rod 64 is held in the same position, sloping in relation to the vertical, as at the suspending station illustrated in FIG. 3 by means of the lower rail 27. The vertebrae clamps 67 are thus also at a distance from the quarter 61, and this enables the operator 70 to remove the muscles of the entire periphery of the quarter 61 by making the latter rotate around itself, the suspension device 58 being capable of rotating around its vertical axis through 180° in both directions. FIG. 4 shows, by way of example, the quarter 61 rotated through 90° in relation to the position illustrated in FIG. 3.

FIG. 4 also shows the existence of the platform 9 mounted on a stationary vertical frame 71 so that it can be moved vertically. The platform 9 has safety rails 72 as well as a gate 73 and a pivoting rod 74 extending transversely in front of the operator 70 at leg height. The rod 74 is mounted so that it pivots around a pivot 75 and carries a control head 76 which has a discontinuity 77. A sensor 78 can interact either with the head 76 or with the discontinuity 77 to produce the rise or the descent of the platform 9. The operator 70 can thus easily control, by pressing harder or less hard on the rod 74, the rising or descending movement of the platform 9 so as to place himself in the most ergonomic position for the manual removal of the muscles with a knife.

FIG. 4 also shows, in section, the conveyor belt 10 which receives the muscles 79 removed by the operator 70 at this treatment station. The operator 70 moves on the platform 9 while following the slow continuous motion of the quarter suspended from the arm 6 which travels in front of him.

FIG. 5 illustrates a subsequent treatment station in the same manner. At this station, the rail 27 is less distant from the overhead rail 1 than at the station illustrated in FIG. 4. Under these conditions, the rod 64 has assumed a position which is substantially vertical. The two vertebral clamps 67 have moved into position in order to be able to clamp the vertebral region of the quarter 61. The grasping of the quarter 61 has been performed by one of the operators either at the station illustrated in FIG. 5 or at a preceding station, merely by applying a slight push to the quarter 61. The vertebral region of the quarter 61 has then entered between the jaws of the vertebral clamps 67, and this has caused the movement of the sensors 80 controlling the closure of the jaws 67. It will be noted, that the closure is controlled by an automatic system whose components are enclosed in the individual control box 81 carried by the upper part 65 of the beam 6. The box 81 of each beam 6 is supplied with electrical energy via the cable 22 leading from the takeup reel 21 (FIG. 1). Pneumatic energy is delivered to each beam 6 via a line which is not shown and which substantially follows the path of the chain 7 and which is connected at several places to the lines 26 leading from the take-up reels 25 (FIG. 1).

The quarter 61 is thus held firmly by the vertebral clamps 67 while remaining suspended from the upper knuckle clamp 59. This clamping, which prevents any rotation of the quarter 61, facilitates the muscle removal work done by the operator 82.

FIG. 5 shows, by way of example, a position of the operator 82 which is higher than in FIG. 4. It will be understood, however, that during his work of removing muscles, each operator continually adjusts his position in order to adopt the most ergonomic position at any time.

The process of the invention takes place, for example, in the following manner, with reference to FIGS. 1 to 5: the quarter is first of all grasped by the telescopic arm 15 and moved as far as the suspending station illustrated in FIG. 3, where it is suspended by the end of the knuckle.

The quarter, thus suspended and hanging from an arm 6 begins its travel along the closed loop of the overhead rail 1. First of all it travels in front of the first two stations along the rectilinear section 2 of the loop. In front of these two stations, the quarter may be turned manually by the operators with a view to removal of the muscles, especially the skirt, fillet, leg cuts and rumpsteak over the entire periphery of the quarter.

At the third station, the operator turns the quarter so as to be able to push the vertebral region between the vertebral clamps 67. At this station, these clamps are in a position close to the quarter, the lower rail 27 having made it possible to eliminate the slope of the arm 6. After the bottom part of the quarter has been immobilized in this manner, the operator continues the removal of the muscles.

The removal (thin flank, false rump, top ribs, leg cuts, steak cuts, and the like) is continued at the other stations, the quarter still being held by the vertebral clamps 67. It will be understood that it would also be possible for some stations to comprise mechanical assistance means to make the manual removal of the muscles easier. Other stations could also be completely automated.

At the seventh station the bottom part of the quarter, held by the clamps 67, has been cut away from the knuckle, thus enabling the knuckle to be turned about itself in order to complete the removal of the muscles. At the last station 86 (FIG. 1) the clamps 67 and 59 open automatically allowing the operator to take hold of and to remove the bones which alone remain on the arm 6, by throwing them into the bin 13.

Figure 6:
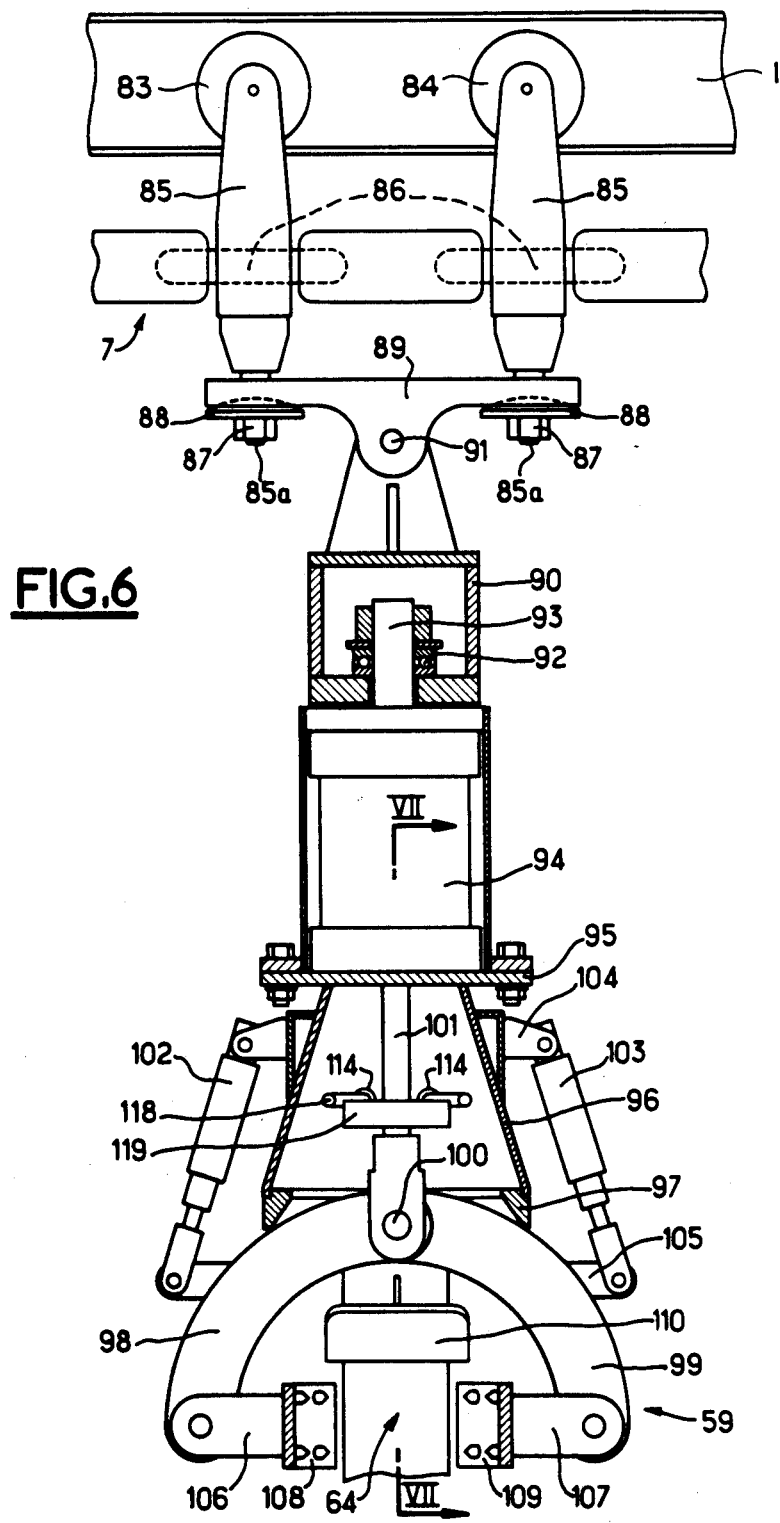
FIG. 6 is an enlarged sectional view of the vertical knuckle clamp of one of the arms of the plant.
Figure 7:
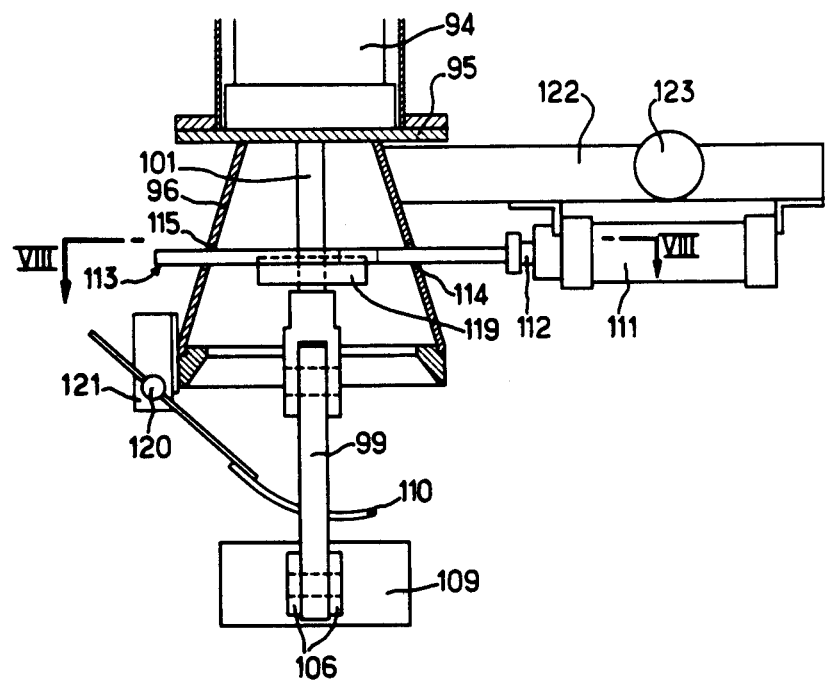
FIG. 7 is a partially sectioned view along VII—VII of FIG. 6, showing in detail the safety device for locking the knuckle clamp.
Figure 8:
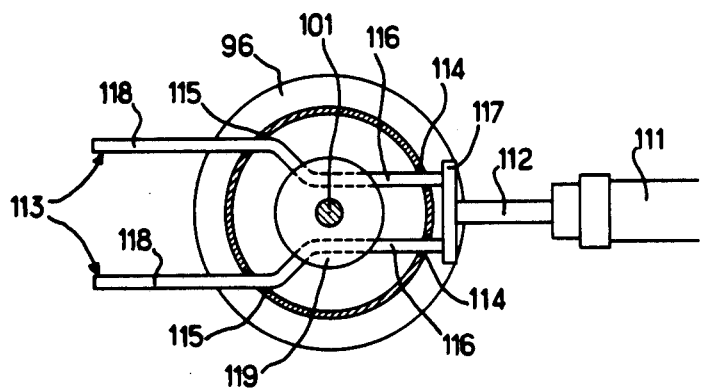
FIG. 8 is a view from above of a section along VIII—VIII of FIG. 7 of the knuckle clamp showing the safety device in locked position.

Reference will now be made to FIGS. 6 to 8 in order to examine in detail the structure of the suspension device 58 with which each arm 6 is equipped.

These figures again show the identical components which bear the same references as in the preceding figures. It again shows, in particular, the overhead rail 1 on which two pairs of roller wheels 83 and 84 travel, placed at a distance corresponding to a pitch of the chain 7. Each pair of roller wheels 83, 84 comprises two roller wheels arranged on each side of the web of the rail 1. The roller wheels 83, 84 are mounted at the end of wishbones 85, each fastened integrally to a link 86 of the chain 7, which is responsible for driving the assembly along the rail 1.

The lower ends of the wishbones 85 have pivots 85 clamped by bolts 87 and hemispherical washers 88 to a head 89 which serves as suspension for the arm 6 assembly. By virtue of these hemispherical washers 88 the head 89 and the arm 6 assembly can perform a low-amplitude swing which permits the rod 64 to slope by means of the rail 27, as has been shown in FIGS. 3 and 4.

A swing bar 90 is suspended from the head 89 by a pivot 91, and this also permits swings around the pivot 91 at right angles to the swings permitted by the hemispherical washers 88.

The swing bar 90 acts as a support for a rolling thrust bearing 92 which permits the rotation of the pivot 93 arranged vertically and fastened integrally to the cylinder 94 of the pneumatic jack for operating the component 59. The cylinder 94 is mounted on a horizontal plate 95 which is integrally fastened to a frustoconical belt 96 whose open, wider diameter, peripheral edge, situated at the lower side of the assembly, comprises a frustoconical friction ring 97 coming into contact with the upper edge of the arms 98 and 99 of the clamp 59. The arms 98 and 99 are integrally fastened to an articulation pivot 100 fastened to the end of the rod 101 of the jack 94. Two side pneumatic springs 102 and 103, each consisting of a small uncontrolled pneumatic jack maintained at a high pressure, are fitted between a suspension lug 104 fastened integrally to the belt 96 and a lower suspension lug 105 fastened integrally to one of the arms 98, 99.

The free ends of the arms 98 and 99 carry transverse-action jaws 106, 107 fitted with curved ends 108, 109 having a plurality of teeth which can enter the flesh of the knuckle, thus improving the grasp of the clamp 59.

FIG. 6 also shows the working end of the paddle 110 of the sensor for the presence of the knuckle within the clamp 59.

FIG. 7 shows the safety device associated with the control of the clamp 59. This safety locking device consists of a pneumatic locking jack 111 whose rod 112 is connected to a pair of transverse rods 113 resembling a wishbone, which enter via orifices 114 and 115 through the walls of the bell 96. As can be seen, particularly in FIG. 8, which is a cross-section from above taken just above the level of the wishbone consisting of the rods 113, the said rods comprise parts 116 connected by a plate 117 to the rod 112 of the jack 111 and parts 118 which project away from the bell 96. The distance separating the parts 118 is greater than that separating the parts 116.

The rod 101 of the jack 94 for actuating the jaws 59 has a retaining disc 119 which is fastened rigidly to the said rod 101, for example by welding. The diameter of the disc 119 is greater than the distance separating the rods 116 and smaller than that separating the rods 118, as can be seen in FIG. 8. When the jaws 59 are closed, that is to say when the rod 101 has been moved upwards by the jack 94, the locking disc 119 which was initially slightly below the level of the wishbone 113, as can been seen in FIGS. 6 and 7, is situated, on the other hand, above this level. The jack 111 is then actuated so as to move the rod 112 in the direction of the bell 96, the wishbone 113 adopting the position illustrated in FIG. 8. In this position, any downward movement of the rod 101 is prevented by the parts 116 of the wishbone 113 whose separation distance is smaller than the diameter of the locking disc 119.

In the event of an accidental interruption of the supply of electrical and/or pneumatic energy to the whole plant, the rod 101 is thus immobilized by the effect of the weight of the quarters 61, which remain held by the clamps 59 in a closed position by virtue of this safety locking device.

It will be noted that, in the position illustrated in FIG. 7, where the rod 112 is retracted, the locking disc 119 passes freely between the arms 118 of the wishbone 113, thus allowing the clamp 59 to be opened. Also to be noted in FIG. 7 is the mounting of the feeler 110 around a pivot 120 of the sensor 121. In addition, the end of the arm 122 carrying the jack 111 has two rubber buffers 123 arranged on each side, which come into contact with the rod 64 when the clamp 59 and its control jack 94 rotate through 180° around the pivot 93.

The operation of the knuckle clamp illustrated in FIGS. 6 to 8 is as follows: when the clamp 59 is in open position, as illustrated in FIG. 6, at the suspending station illustrated in particular in FIG. 3, the knuckle is moved, as already indicated, until its end comes into contact with the feeler 110. The presence detector then signals to the control of the pneumatic jack 94 which applies a pull to the rod 101. It should be noted that at this stage the locking jack 111 is in the position illustrated in FIG. 7 so that the locking disc 119 can pass between the outspread rods 118 of the wishbone 113. As soon as the jaws of the clamp 59 have closed onto the knuckle, the locking jack 111 is actuated so that it is moved as far as the position illustrated in FIG. 8, which corresponds to the safety position. It will be noted that the closing of the jaws of the clamp 59 has been produced merely by a pull on the rod 101, the arms 98 and 99 coming to bear on the frustoconical annular edge 97 of the bell 96. This movement has taken place against the return force of the two resilient jacks 102 and 103.

In order to open the jaws of the clamp 59 at the last treatment station of the plant, the safety device is firstly released by the locking jack 111 being made to return to the position illustrated in FIG. 7. The jack 94 is then operated so as to apply a thrust to the rod 101. The arms 98 and 99 of the clamp 59 then open by virtue of the pull exerted by the two return jacks 102 and 103, together with the descending movement of the pivot 100. The automatic control of these movements in front of the last station of the plant is performed by feelers and detectors mounted on the arms and interacting with the fixed cams or by other similar means of a conventional type which are not shown in the Figures.

Figure 9:
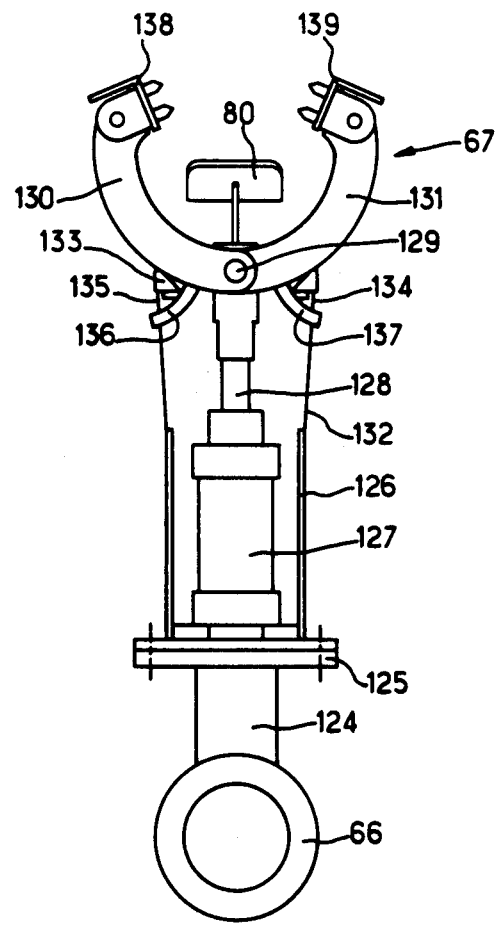
FIG. 9 is a partially sectioned view from above of one of the horizontal clamps intended to clamp the dorsal vertebrae region.

FIG. 9 shows detail of the structure of one of the vertebral clamps 67 fastened to the rod 66 of each arm 6. A supporting member 124 is fastened rigidly, for example by welding, at right angles to the rod 66 and carries a flange 125 to which is fastened the framework 126 of a pneumatic jack 127. The free end of the rod 128 of the jack 127 is connected to the pivot 129 of the two arms 130 and 131 of the clamp 67. In a manner resembling that of the knuckle clamp 59 illustrated in FIG. 6, the vertebral clamps 67 comprise a frustoconical bell 132 whose open outer edge is fitted with a friction ring 133 with a frustoconical surface which comes into contact with the outer edge of the arms 130 and 131. The bell 132 is fastened to the framework 126 and has side orifices 134 and 135 permitting the passage of retaining fingers 136 and 137 fastened integrally to the arms 130 and 131 of the clamp 67. The free ends of the arms 130 and 131 comprise clamping jaws 138, 139 fitted with teeth improving the penetration of the flesh of the quarter. FIG. 9 also shows the working end of the feeler 80 whose movement controls the closing the clamp 67 by means of the pneumatic jack 127.

The clamp 67 operates similarly to the knuckle clamp 59 illustrated in FIG. 6. In fact, the closing of the clamp 67 is produced by a pull on the rod 128, with the arms 130 and 131 coming to bear on the frustoconical rim 133 of the bell 132. To cause the clamp 67 to open, it is merely necessary to apply a push to the rod 128, whereupon the arms 130 and 131 come to bear, via fingers 136 and 137, on the orifices 134 and 135 in the bell 132. The closing of the jaws 67 is performed automatically by pushing the quarter of meat in the direction of the jaw 67, the dorsal vertebral region coming into contact with the feeler 80.

Figure 10:
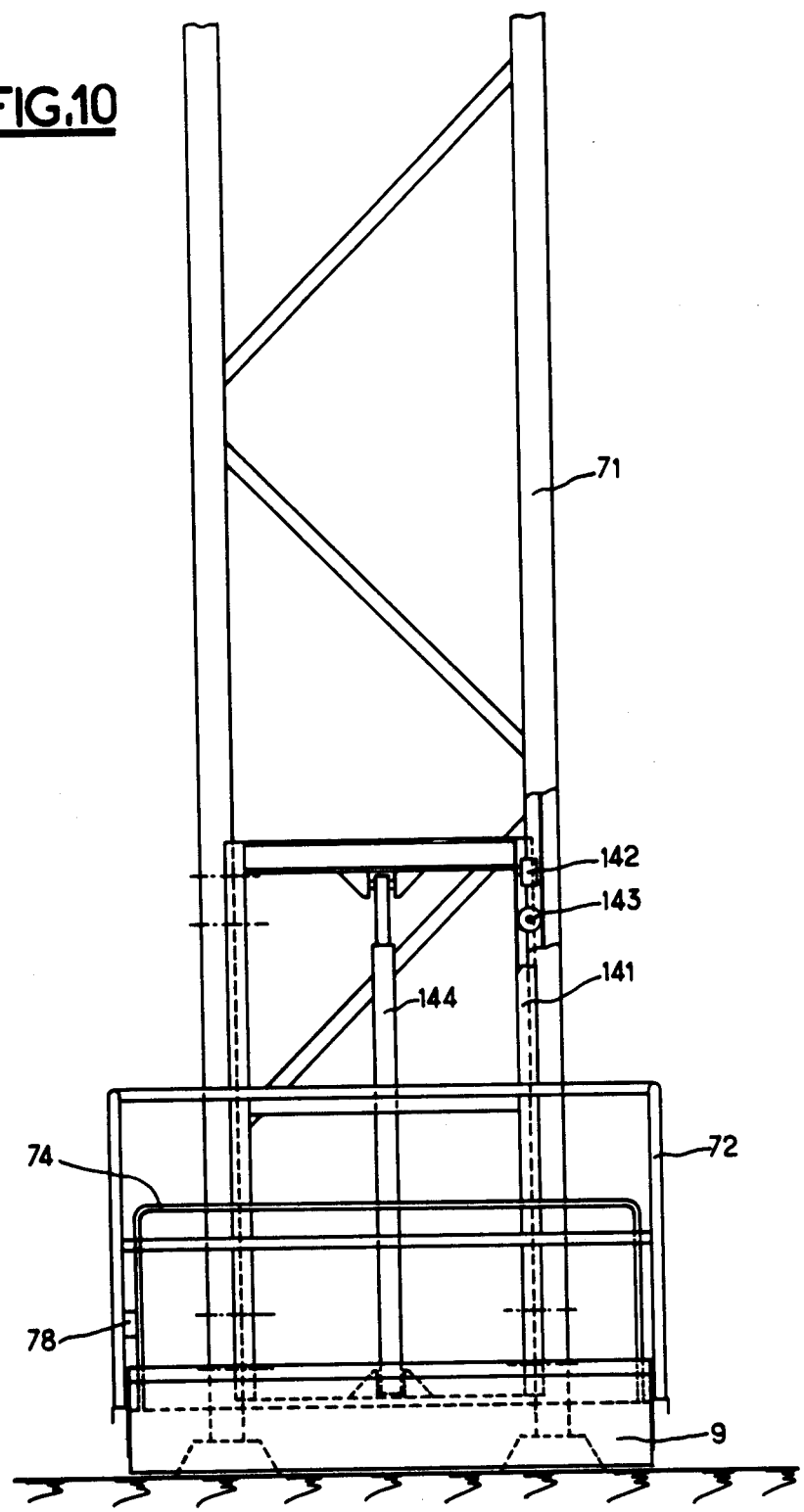
FIG. 10 is an elevation view of one of the platforms used at the treatment stations of the plant.

FIG. 10 shows some details of one of the platforms 9 of the plant. This elevation view shows that the platform 9 is integrally fastened to a movable frame 141 capable of travelling by means of roller wheels 142 and 143 along the stationary vertical frame 71 under the effect of a vertical jack 144, operated pneumatically or hydraulically. It will be noted that the axles of the roller wheels 142 and 143 are at right angles, and this improves the guidance of the movable frame 141 in the steel U-channels forming the stationary frame 71.

Figure 11:
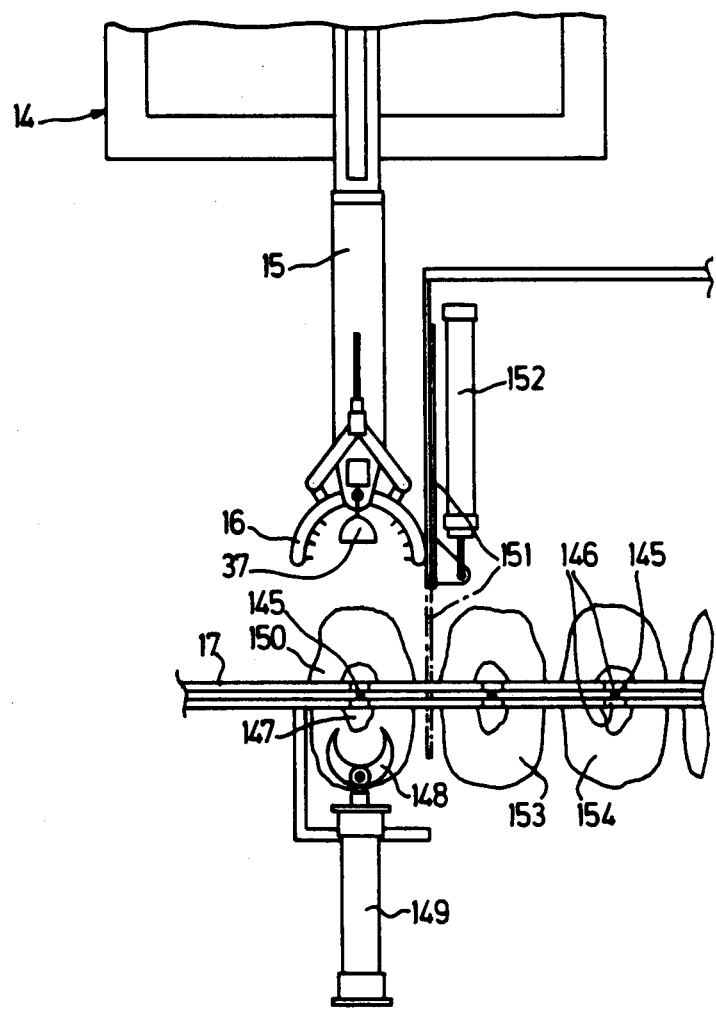
FIGS. 11 and 12 illustrate the cutting of the tendon of a hindquarter.
Figure 12:
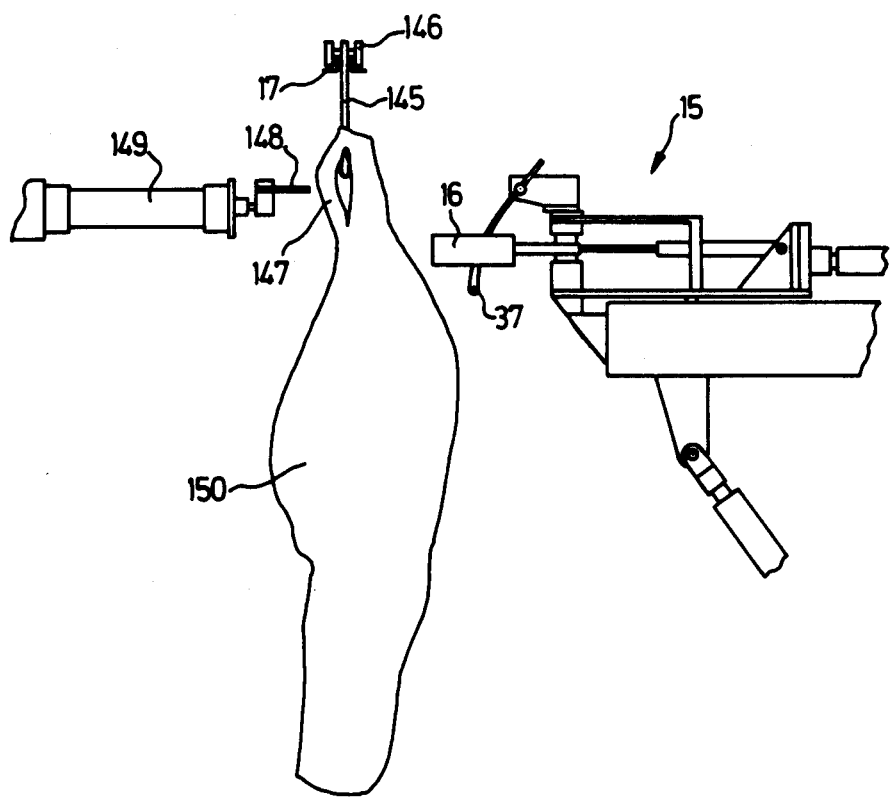

FIGS. 11 and 12 illustrate in detail the sectioning of the tendon which is carried out immediately after the knuckle has been gripped by the transfer and loading device 14. These Figures, in which identical components bear the same references, again show the telescopic arm 15 at the end of which the grasping clamp 16 is mounted. The hindquarters hanging on hooks arrive along the rail 17 on which the hooks 145 move by means of rollers 146. Each hook 145 passes through the orifice left free by the tendon 147, as can be seen in FIG. 12. A number of hindquarters are shown waiting on the rail 17 on the right-hand side of FIG. 11. The preceding station for sectioning the tendon comprises a cutter 148 operated automatically by means which are not shown and which are associated with a pneumatic jack 149 mounted so that the cutter 148 is situated in a horizontal plane at the height of the tendon 147 when the corresponding quarter 150 is placed in the position where it can be gripped by the transfer and loading device 14.

A sliding protective panel 151 operated by a pneumatic jack 152 makes it possible, furthermore, to separate the quarter 150 from the remaining waiting quarters 153 and 154 (FIG. 11) while ensuring the safety of the system in respect of the operators.

This station operates as follows: the telescopic arm 15 is firstly operated until the knuckle of the quarter 150 comes into contact with the feeler 37, which causes the closure of the jaws 16 which clamp the quarter 150 in the knuckle region, that is to say in a horizontal plane situated below that of the cutter 148, the latter being at the level of the tendon 147. After this gripping by the grasping clamp 16 has taken place, the jack 149 is operated, and this controls the movement of the cutter 148 towards the tendon 147; closure of the said cutter is then performed, resulting in the sectioning of the tendon. After the cutter 148 has returned to a rest position, the telescopic arm 15 is raised and then moves backwards, releasing the quarter 150 from the hook 145 by virtue of the sectioning of the tendon 147. The quarter 150, supported in this manner by the transfer and loading device 14, can then be moved as was explained earlier, as far as the suspending station.

We claim:

1. A method for semi-automatic processing quarters of bovine animal or other quadrupeds comprising the steps of:
   a. vertically suspending the quarters by a hook means hanging on a first overhead rail assembly;
   b. gripping an upper portion of the quarter still hanging by said hook;
   c. severing a part of said upper portion of the quarter to free the quarter from said hook;
   d. moving the quarter from said first overhead rail assembly to a second overhead rail assembly formed in a closed loop and having a plurality of means for suspending the quarter travelling continuously along said second rail assembly;
   e. elevating the quarter until said upper portion can be clamped in one of said suspension means;
   f. moving said quarter clamped on said suspension means along said closed loop in front of a plurality of processing stations arranged at intervals along said closed loop;
   g. manually separating the muscles and meat from the bones by a plurality of operators without performing a substantial intermediate deboning operation while said quarter is moved along said closed loop, and while permitting a vertical movement in both directions controlled by each operator at each station; and
   h. releasing the remaining skeleton from said suspension means at a last station so as to permit the clamping of a new quarter on said suspension means.

2. Process according to claim 1, characterized in that a rotation of the quarter about itself is permitted at least some treatment stations and, on the other hand, the quarter is held fast against any rotation at other stations by being gripped by the vertebrae.

3. Process according to claim 2, characterized in that the slope of the quarter in relation to the vertical is changed in front of some stations.

4. Process according to claim 1, suitable for the treatment of hindquarters, characterized in that after some of the muscles have been removed and the retention of the quarter against any rotation is ensured, the leg is separated from the said bottom part so as to permit a rotation of the leg suspended vertically for the removal of the remaining muscles, the bottom part of the quarter continuing its travel at the same time as the leg along the abovementioned closed loop path.

5. A semi-automatic process system for processing quarters of bovine animals or other quadrupeds comprising:
   a. an automatic transfer and loading device having a gripping means capable of moving a quarter from a first position where said quarter is hanging on a hook means movable along a first overhead rail assembly to a second position where said quarter can be clamped by its upper portion;
   b. a second overhead rail assembly formed in a closed loop and having a plurality of suspending arm means suspended at regular intervals along said closed loop, each of said arm means comprising a vertical clamp means mounted on said arm for vertical rotation and capable of suspending a quarter by its upper portions; and at least one horizontal clamp means mounted on said arm for movement between a first position away from said quarter and a second position for clamping a lower portion of said quarter;
   c. a plurality of stationary processing stations arranged along at least part of the closed loop and outside the latter, each station comprising a platform equipped with manually controlled means for automatic vertical movement;
   d. meat removal means arranged under the closed loop for receiving the muscles removed at the various processing stations; and
   e. bone removal means positioned at one end processing station for receiving the skeleton of the quarter remaining suspended by said vertical clamp means of said arm after all muscles have been removed.

6. Plant according to claim 5, characterized in that the grasping member of the transfer and loading device is capable of performing a telescopic movement followed by a rotary movement.

7. Plant according to claims 5 or 6, characterized in that it additionally comprises an energy supply power station arranged within the closed loop, equipped with a stationary central collector (19) interacting with a rotary tray (20) driven synchronously with the suspending arms (6), the said tray (20) carrying at least one distributor means for energy supply lines which are connected to at least one group of arms (6).

8. Plant according to claim 5, characterized in that the closed loop is of oblong shape overall and that the tray (20) carries several take-up reels (21, 25) with elastic retraction, each receiving a supply line connected to a group of arms (6).

9. Plant according to claim 7, characterized in that it is supplied with electrical and pneumatic energy, the electrical cables being wound onto take-up reels which are different from the compressed air lines.

10. Plant according to claim 5, characterized in that each suspending arm (6) comprises:
   an oscillating suspension device comprising roller wheels (83, 84) interacting with the overhead rail (1) and means for suspending the quarter comprising a vertical clamp (59) with automatic pneumatic control mounted so that it can rotate on a vertical pivot (93);
   a substantially vertical rod (64) fastened by its top part to the suspension device; and
   at least one horizontal clamp (67) with pneumatic and automatic control mounted on the abovementioned rod and capable of clamping a part of the skeleton of the quarter at least at some treatment stations.

11. Plant according to claim 10, characterized in that each arm additionally comprises an energy distribution box (81) mounted on the abovementioned rod and connected by at least one supply line to the energy supply power station situated within the closed loop.

12. Plant according to claim 10, characterized in that the suspension device (89) is fastened to the roller wheels (83, 84) by means of hemispherical washers (88) permitting a low-amplitude swing in a plane at right angles to the movement of the arm (6).

13. Plant according to claim 10, characterized in that each horizontal clamp (67) is mounted so that it can rotate on the vertical rod (64) and interacts with a retraction device with a view to a limited rotation.

14. Plant according to claim 10, characterized in that the clamps (59, 67) comprise two pivoting arms (98, 99, 130, 131) mounted on a pivot fastened integrally to the end of the rod of a pneumatic jack (94, 127) and an abutment means (97, 133) interacting with the abovementioned arms to cause them to close automatically when the rod of the jack is pulled.

15. Plant according to claim 14, characterized in that the clamps (59, 67) comprise means for retaining the abovementioned arms (102, 103, 136, 137) to cause the automatic opening of the said arms when the rod of the jack is pushed.

16. Plant according to claim 14, characterized in that a detector of presence by means of contact (110, 140) is mounted between the arms of the clamps (59, 67) and controls the action of the jack (94, 127) when a part of the quarter enters between the arms of the clamps.

17. Plant according to claim 10, characterized in that the vertical clamp (59) comprises a safety device for locking in closed position comprising a transverse wishbone (113) actuated by a locking jack (111) which immobilizes the rod (101) of the jack (94) actuating the clamp.

18. Plant according to claim 5, characterized in that it comprises a plurality of position sensors interacting with fixed cams arranged along the path of the arms (6) in order to control automatically some of the opening and closing movements of the clamps.

19. Plant according to claim 5, characterized in that it comprises a lower rail (27) arranged within the loop formed by the abovementioned overhead rail (1) and forming a loop of similar overall shape, the said lower rail (27) interacting with the lower ends of the rods (66) of the arms (6).

20. Plant according to claim 19, characterized in that the lower rail (27) has discontinuities in its path in order to change automatically the slope of the rods at some treatment stations.

21. Plant according to claim 5, characterized in that each platform (9) is mounted with a view to being moved vertically on a stationary vertical frame (71) by means of roller wheels (142, 143), the movement being produced by a jack (144) controlled by a pivoting transverse rod (74) arranged so that it can be actuated by the operator's leg.

22. Plant according to claim 5, characterized in that the suspending arms (6) are fastened to a chain (7) travelling continuously along the overhead rail (1).

23. Plant according to any one of claim 6 characterized in that the transfer and loading device comprises a telescopic arm (15) mounted on a toothed crown ring capable of being driven in rotation (39) and capable of moving vertically under the effect of a hydraulic jack (44).

24. Plant according to claim 23, characterized in that the telescopic arm (15) is mounted pivoting (29) on the crown ring (39), with a hydraulic jack (49) controlling its slope in relation to the horizontal.

25. Plant according to claim 23, characterized in that a transverse suspending clamp (36) is mounted at the end of the telescopic arm (15).

26. Plant according to claim 23, characterized in that the telescopic transfer arm is controlled so that it performs the following movements:
   horizontal telescopic movement;
   continuous rotary and elevation movement; and
   pivoting upwards in order to introduce the end of the quarter into a vertical clamp of an arm (6).

27. Plant according to claim 5, suitable more particularly for the treatment of hindquarters, characterized in that the vertical clamp is adapted to clamp the knuckle and is held clamped throughout the operations of removal of the muscles, from the suspension of the quarter until the release of the remaining skeleton at the last station.

28. Plant according to claim 27, characterized in that the horizontal clamp or the horizontal clamps are suitable for clamping the vertebral region after some of the muscles have been removed.

29. Plant according to claim 27, characterized in that it comprises a preliminary station for sectioning the tendon comprising an automatically controlled cutter brought into operation after the grasping member has gripped the knuckle, thus permitting the hook from which the hindquarter originally hanging to be released.

30. Plant according to claim 27 characterized in that it comprises a sliding protective panel capable of separating the quarter which is to be gripped by the grasping member from the following waiting quarters at the time of the grasping operation.

* * * * *